United States Patent
Watanabe et al.

(10) Patent No.: US 7,494,726 B2
(45) Date of Patent: Feb. 24, 2009

(54) PERPENDICULAR MAGNETIC RECORDING MEDIUM, METHOD OF MANUFACTURING SAME, AND MAGNETIC RECORDING DEVICE

(75) Inventors: Sadayuki Watanabe, Nagano (JP); Yasushi Sakai, Nagano (JP)

(73) Assignee: Fuji Electric Device Technology Co., Ltd. (JP)

( * ) Notice: Subject to any disclaimer, the term of this patent is extended or adjusted under 35 U.S.C. 154(b) by 435 days.

(21) Appl. No.: 11/174,286

(22) Filed: Jul. 1, 2005

(65) Prior Publication Data
US 2006/0014052 A1 Jan. 19, 2006

(30) Foreign Application Priority Data
Jul. 7, 2004 (JP) ............... 2004-201115

(51) Int. Cl.
*G11B 5/64* (2006.01)
*G11B 5/738* (2006.01)
*B05D 5/12* (2006.01)

(52) U.S. Cl. .................. 428/831.2; 427/131
(58) Field of Classification Search ............ None
See application file for complete search history.

(56) References Cited

U.S. PATENT DOCUMENTS

| | | | |
|---|---|---|---|
| 5,679,473 A | | 10/1997 | Murayama et al. |
| 5,843,561 A | * | 12/1998 | Uwazumi et al. .......... 428/141 |
| 5,846,648 A | * | 12/1998 | Chen et al. ............... 428/332 |
| 6,174,597 B1 | * | 1/2001 | Yusu et al. ............... 428/332 |
| 6,372,367 B1 | * | 4/2002 | Matsuda et al. .......... 428/831.2 |
| 6,677,051 B1 | * | 1/2004 | Acharya et al. .......... 428/831.2 |
| 7,141,317 B2 | * | 11/2006 | Kikitsu et al. ............ 428/829 |
| 7,183,011 B2 | * | 2/2007 | Nakamura et al. ........ 428/831.2 |
| 2005/0186450 A1 | * | 8/2005 | Takenoiri et al. .......... 428/827 |

FOREIGN PATENT DOCUMENTS

| | | |
|---|---|---|
| JP | 3-58316 A | 3/1991 |
| JP | 2002-358615 A | 12/2002 |
| JP | 2003-223712 A | 8/2003 |

OTHER PUBLICATIONS

Aoyama, T. et al., "The Fabrication of Co-Pt Patterned Media with Perpendicular Magnetic Anisotropy," Abstracts of the papers presented at 24th Meeting of The Magnetic Society of Japan (2000), p. 283.
Chinese Office Action, mailed Apr. 4, 2008, issued in counterpart application CN 2005100844788.

* cited by examiner

*Primary Examiner*—Kevin M Bernatz
(74) *Attorney, Agent, or Firm*—Rossi, Kimms & McDowell LLP (57) ABSTRACT

A perpendicular medium is disclosed in which an isolation structure of an underlayer is formed using a simple method as in a conventional manufacturing process for a medium of continuous films. The method suppresses dispersion of alignment and reduced magnetic cluster size in a magnetic recording layer. The perpendicular medium exhibits high recording density owing to thin film thickness of the underlayer. A perpendicular magnetic recording medium includes at least an underlayer and a magnetic recording layer sequentially laminated on a nonmagnetic substrate. The underlayer consists of crystal grains and an amorphous grain boundary, and the crystal grain has a shape holding a relation (an area of a bottom region at an initial stage of growth)>(an area of a top region).

12 Claims, 5 Drawing Sheets

PERPENDICULAR MAGNETIC RECORDING MEDIUM, METHOD OF MANUFACTURING SAME, AND MAGNETIC RECORDING DEVICE

CROSS REFERENCE TO RELATED APPLICATIONS

This application is based on, and claims priority to, Japanese Application No. 2004-201115, filed on Jul. 7, 2004, the contents of which are incorporated herein by reference.

BACKGROUND OF THE INVENTION

A. Field of the Invention

The present invention relates to a perpendicular magnetic recording medium mounted on various magnetic recording devices, to a method of manufacturing the same, and to a magnetic recording device using the perpendicular magnetic recording medium.

B. Description of the Related Art

A perpendicular magnetic recording system in which the recording magnetization is recorded in a direction perpendicular to the plane of a medium is drawing attention as a technology to attain high density of magnetic recording in place of a conventional longitudinal magnetic recording system in which the recording magnetization is recorded in a direction along the plane of a medium. A perpendicular magnetic recording medium is mainly composed of a magnetic recording layer of a hard magnetic material with perpendicular magnetic anisotropy, an underlayer for aligning the magnetic recording layer in the desired direction, a protective layer for protecting a surface of the magnetic recording layer, and a backing layer of a soft magnetic material for concentrating the magnetic flux generated by a magnetic head used to record on the recording layer. This medium usually has a layer structure in the sequence of backing layer/underlayer/ magnetic recording layer/protective layer. Although a soft magnetic backing layer raises the medium performance, this layer is occasionally omitted since recording is possible without the soft magnetic backing layer. A medium without a soft magnetic backing layer is called a single layer perpendicular magnetic recording medium (hereinafter "a single layer perpendicular medium"), while a medium with a soft magnetic backing layer is called a double layer perpendicular magnetic recording medium (hereinafter "a double layer perpendicular medium").

A perpendicular magnetic recording medium (hereinafter "a perpendicular medium"), similarly to a longitudinal magnetic recording medium, also needs compatibility between low noise and high thermal stability to achieve high recording density. Low noise can be achieved by minimization of magnetic grains or reduction of magnetic interaction between the magnetic grains (hereinafter "intergranular interaction"). There is an index called a magnetic cluster size that includes an effect of a magnetic grain diameter and represents a magnitude of the intergranular interaction. A magnetic cluster is composed of a plurality of magnetic grains. The magnetic cluster size is small when the size of the magnetic grain or the intergranular interaction is small. Therefore, the magnetic cluster size must be decreased for the noise reduction.

However, a limitation is imposed on the minimization of the magnetic grains composing the magnetic recording layer because the magnetic grains are transformed to a superparamagnetic state and lose ferromagnetic property when the grain diameter becomes smaller than 4 nm. Accordingly, the reduction of the intergranular interaction is a key issue for the enhancement of recording density. Thus, a patterned media has been proposed aiming at an ideal condition in which one grain is equal to one bit by forming one grain in a magnetic layer in a truncated cone shape applying a technique in the semiconductor process. (See Abstracts of the papers presented at 24th meeting of The Magnetic Society of Japan, p. 283 (2000), for example.)

In a perpendicular medium having a magnetic recording layer composed of normal continuous films, the formation of a segregation structure has been proposed in which a CoCr alloy is used and the concentration of nonmagnetic chromium in the grain boundary is at least 1.4 times the concentration in the crystal grains. (See Japanese Unexamined Patent Application Publication No. 2002-358615, for example.) In addition, a magnetic recording layer (called a granular magnetic recording layer) has been proposed that employs a grain boundary phase of a nonmagnetic and nonmetallic substance, for example, oxide or nitride. (See Japanese Unexamined Patent Application Publication No. H3-58316 and U.S. Pat. No. 5,679,473, for example.)

In every above-mentioned proposal, an appropriate underlayer is used for the purpose of controlling crystal alignment of the magnetic recording layer. However, most attempts for improving the isolation in the magnetic recording layer, i.e., decreasing the intergranular interaction, are currently carried out by changing the composition of the magnetic recording layer itself or improving the process of depositing the layer. Among these, it has been proposed to miniaturize the grains in a magnetic layer utilizing an effect of an underlayer in a perpendicular medium employing a magnetic layer of a multilayer film of artificial lattice. (See Japanese Unexamined Patent Application Publication No. 2003-223712, for example.) The miniaturization of the grains in a magnetic layer was difficult in this type of magnetic layer material. The miniaturization was carried out in the reference by forming the crystal grain in the underlayer in a sphere or an ellipsoid, to produce irregularity on the underlayer surface.

To magnetically isolate magnetic grains in a magnetic recording layer and decrease the intergranular interaction, it is effective to form an underlayer having a structure of physically isolated crystal grains and isolate magnetic grains in the magnetic recording layer utilizing the effect of the underlayer. A method similar to the one disclosed in Japanese Unexamined Patent Application Publication No. 2002-358615, for example, possibly forms an underlayer having an artificially isolating structure. The method is, however, very complicated in the manufacturing process, and thus unsuitable for mass production.

The use of an underlayer having an irregular surface produced by crystal grains as proposed in Japanese Unexamined Patent Application Publication No. 2003-223712, also has a problem. The shape of the surface of crystal grains in the underlayer affects the dispersion of crystal orientations in the magnetic recording layer, and the dispersion of the crystal orientations, in turn, means the dispersion of orientations of perpendicular magnetic anisotropy. Thus, a large curvature of the surface of crystal grains on the substrate surface is considered to degrade the dispersion of orientations of perpendicular magnetic anisotropy. From this point of view, the shape of the surface of crystal grains in the underlayer, which is reflected in the magnetic recording layer disposed on the underlayer, is preferably made as flat as possible. When the grain diameter of the crystal grains in the underlayer is increased for decreasing the curvature of the grain in this method, the number of grains per unit area decreases. Because the number and size of the magnetic grains in the magnetic recording layer reflect the number and size of the crystal grains in the underlayer, a problem of thermal fluctuation becomes significant due to decrease of the number of magnetic grains. On the other hand, when the grain diameter of the crystal grains in the underlayer is decreased, the grain diameter of the magnetic grains in the magnetic recording layer decreases reflecting the decrease of the area of a crystalline portion per one crystal grain on the underlayer surface. As a result, grains smaller than 4 nm, which are transformed to a superparamagnetic state, increase and this also raises the problem of thermal fluctuation.

Therefore, the underlayer proposed in Japanese Unexamined Patent Application Publication No. 2003-223712, while allowing minimization of magnetic grains, cannot simultaneously satisfy all of the following conditions:

(1) to increase the number of magnetic grains per unit area,
(2) to suppress generation of superparamagnetic grains, and
(3) to reduce the dispersion of orientations in the magnetic recording layer.

Further, when the crystal grains in the underlayer is minimized for the purpose of minimization of the magnetic grains, improvement in crystallinity of the underlayer is difficult since the volume of a crystalline portion is small particularly at the initial stage of growth, which is essential to obtain the crystallinity. As a result, a relatively large thickness is needed to accomplish sufficient crystal growth. For the above-described reason, it is difficult to improve medium performance or enhance recording density by using an underlayer comprising crystal grains having the shape of a sphere or an ellipsoid.

Accordingly, there remains a severe problem to obtain a method of manufacturing such a perpendicular medium that an isolation structure of an underlayer can be formed using a simple method as in a conventional manufacturing process of a medium of continuous films and the isolation structure of underlayer allows suppressing the dispersion of alignment and reducing a magnetic cluster size in a magnetic recording layer, and that a high recording density can be achieved owing to thin film thickness of the underlayer.

The present invention is directed to overcoming or at least reducing the effects of one or more of the problems set forth above.

SUMMARY OF THE INVENTION

It is an object of the invention to provide a perpendicular medium comprising a magnetic recording layer having a smaller magnetic cluster size and less dispersion of orientations, and an underlayer having a smaller film thickness. Such a medium improves the resolution of magnetic recording and achieves high recording density. Another object of the invention is to provide a method of manufacturing such a perpendicular medium with excellent productivity.

A perpendicular magnetic recording medium according to the present invention is a perpendicular magnetic recording medium comprising at least an underlayer and a magnetic recording layer laminated sequentially on a nonmagnetic substrate. The underlayer is composed of crystal grains and an amorphous grain boundary. The crystal grain has a shape such that an area of a bottom region at an initial stage of growth is greater than an area of a top region. Advantageously, the magnetic recording layer comprises ferromagnetic crystal grains and a nonmagnetic material surrounding the ferromagnetic crystal grains, each ferromagnetic crystal grain having a grain diameter substantially equal to a grain diameter of the crystal grains in the underlayer at the top region, where the average distance between the ferromagnetic crystal grains, i.e., the width of the nonmagnetic material, is substantially equal to a width of the amorphous grain boundary in the underlayer. Provided $d_1$ and $t_1$ are the grain diameter of the crystal grain and the width of the amorphous grain boundary in the underlayer at the top region, and provided $d_2$ and $t_2$ are the grain diameter of the crystal grain and the width of the amorphous grain boundary in the underlayer at the initial stage of growth, $d_1$ is advantageously at least 4.0 nm and $t_1$ is at least 0.5 nm, and the relations $d_2 > d_1$ and $t_2 < t_1$ hold. Advantageously, a surface of the crystal grains in the underlayer is flat at an interface between the underlayer and the magnetic recording layer. Preferably, the crystal grains in the underlayer have a shape of a truncated cone or a truncated pyramid. In a preferred embodiment, the perpendicular magnetic recording medium further comprises a seed layer beneath the underlayer.

The crystal grains in the underlayer preferably contain at least 50% of Ru, Rh, Os, Ir, or Pt. The amorphous grain boundary preferably contains oxygen or nitrogen.

The method according to the invention of manufacturing a perpendicular magnetic recording medium includes at least an underlayer and a magnetic recording layer sequentially laminated on a nonmagnetic substrate. The method comprises a step of forming on the nonmagnetic substrate an underlayer that consists of crystal grains having a shape holding a relation (an area of a bottom region at an initial stage of growth) > (an area of a top region) and an amorphous grain boundary, and a step of forming a magnetic recording layer on this underlayer. The step of forming the underlayer can be carried out by continuously varying deposition speed. Alternatively, the step of forming the underlayer can be carried out by adding oxygen or nitrogen to an atmospheric gas in a deposition process and continuously varying a concentration of the oxygen or nitrogen. In this step, the material of the underlayer can contain one or more elements selected from Al, Si, Cr, Zr, Y, Mg, Ti, B, Ta, and Nb, which exhibit high reactivity with the oxygen or nitrogen, and the oxide or nitride can be segregated to the grain boundary. As another method, the step of forming the underlayer can be carried out by applying bias voltage to the substrate and varying the bias voltage.

The crystal grains in the underlayer of a perpendicular medium having a shape as described above have the following effects.

(1) Since the width of the grain boundary in the underlayer in the top region can be made large, the magnetic recording layer deposited on the underlayer forms a favorable segregation structure still in the initial stage of the deposition process. As a result, the magnetic interaction between grains is reduced and the size of a magnetic cluster is decreased, reducing media noises.

(2) Since the bottom region of the underlayer has a larger grain diameter and a smaller width of grain boundary than the top region, the bottom region, which is a portion of the underlayer at an initial stage of growth, has a higher ratio of crystalline portion to amorphous portion than the top region. Therefore, crystallinity as the whole underlayer is better in comparison with case of conventional column structure in which a grain diameter of top region is the same as bottom. As a result, the crystallinity of the magnetic recording layer is improved, the perpendicular magnetic anisotropy is enhanced, and the resistance to thermal fluctuation is improved.

(3) The underlayer can be made thin, thereby improving the recording capability.

(4) The flatness of the crystalline top region leads to reduction of dispersion of orientations of perpendicular magnetic anisotropy in the magnetic recording layer, which in turn means reduction of dispersion of orientations of recording magnetization. This reduces transition noises and increases perpendicular magnetization component, to enhance output signals.

(5) The shape of a truncated cone or a truncated pyramid suppresses joining of neighboring grains in the growth process, providing an effect to decrease the dispersion of grain diameters. Since the grain diameter of the magnetic recording layer follows that of the underlayer, the magnetic grains are made uniform, which contributes to reduction of transition noises.

The above effects of (1) through (5) improve SNR, which is an index of recording density, and at the same time satisfy the resistance to thermal stability. Therefore, the high recording density in a perpendicular medium is achieved.

Some preferred embodiments according to the invention will be described with reference to accompanying drawings.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
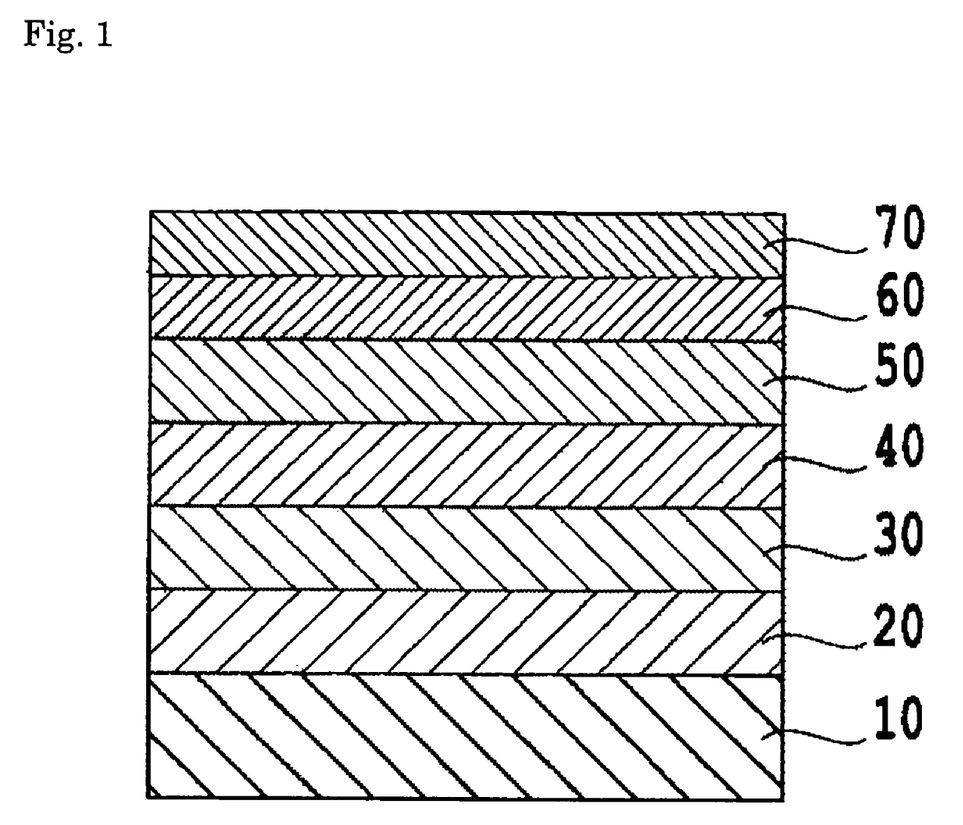
FIG. 1 is a schematic sectional view of a double layer perpendicular magnetic recording medium according to the invention.

FIG. 1 illustrates an example of structure of a perpendicular magnetic recording medium according to the invention. The figure shows a structure of a double layer perpendicular medium. A perpendicular magnetic recording medium of FIG. 1 comprises soft magnetic backing layer 20, seed layer 30, underlayer 40, magnetic recording layer 50, and protective layer 60 sequentially laminated on nonmagnetic substrate 10, and lubricant layer 70 formed on the protective layer 60. Among the layers, soft magnetic backing layer 20, seed layer 30, protective layer 60, and lubricant layer 70 are optionally provided.

Nonmagnetic substrate 10 in a perpendicular magnetic recording medium of the invention can be composed of an aluminum alloy with a NiP plating, strengthened glass, or crystallized glass, each of which is commonly used in magnetic recording media. When a temperature of substrate heating is within 100° C., a plastic substrate of a resin such as polycarbonate or polyolefin can also be used.

Soft magnetic backing layer 20 is optionally provided. Soft magnetic backing layer 20 is preferably formed to improve read/write performance controlling the magnetic flux from a magnetic head used for magnetic recording. Soft magnetic backing layer 20 can be composed of a crystalline alloy of NiFe, Sendust (FeSiAl), or CoFe, or a microcrystalline material of FeTaC, CoFeNi, or CoNiP. An amorphous cobalt alloy such as CoNbZr or CoTaZr can provide a superior electromagnetic conversion characteristic. The optimum thickness of soft magnetic backing layer 20 changes depending on the structure and characteristics of the magnetic head used for magnetic recording. When the backing layer is formed by continuous deposition with other layers (by means of evaporation, sputtering, CVD, ion plating, etc.), the thickness is preferably in the range of 10 nm to 500 nm in the balance with productivity. When the backing layer is formed by plating, for example, before depositing other layers, the thickness can be as thick as several microns (μm).

Seed layer 30 is optionally provided. The seed layer is desired to be formed directly under underlayer 40 to improve alignment of underlayer 40 and to minimize the grain diameter of the underlayer. Although seed layer 30 can be formed using a nonmagnetic material or a soft magnetic material, a soft magnetic material is superior for obtaining an effect to reduce the thickness of the underlayer. If the seed layer is a very thin film of about 1 nm or less, a nonmagnetic material can also produce the effect to reduce the thickness of the underlayer.

The soft magnetic material for forming seed layer 30 can be selected from: nickel-based alloys including NiFe, NiFeNb, NiFeB, NiFeSi, and NiFeCr; cobalt; and cobalt-based alloys including CoB, CoSi, CoNi, and CoFe. The nonmagnetic material for forming seed layer 30 can be selected from a nickel-based alloy such as NiP, a cobalt-based alloy such as CoCr, and further, tantalum and titanium. Seed layer 30 can be formed using the soft magnetic or nonmagnetic material by means of evaporation, sputtering, CVD, or ion plating.

Underlayer 40 is formed directly under magnetic recording layer 50 for appropriately controlling crystal alignment, grain diameter, grain diameter distribution, and grain boundary segregation of magnetic recording layer 50. Underlayer 40 consists of crystal grains 41 and amorphous grain boundary 42. Crystal grain 41 has a shape holding the relation (an area of a bottom region at an initial stage of growth)>(an area of a top region). Specifically, a grain diameter of the crystal grain $d_1$ and a width of the amorphous grain boundary $t_1$ in the underlayer at the top region, that is, at the interface with the magnetic recording layer, and a grain diameter of the crystal grain $d_2$ and a width of the amorphous grain boundary $t_2$ in the underlayer at the initial stage of growth preferably hold the relations $d_2 > d_1$ and $t_2 < t_1$. Ferromagnetic crystal grain 51 of magnetic recording layer 50 formed directly on the underlayer is formed on crystal grain 41 of the underlayer. The diameter of ferromagnetic crystal grain 51 follows the diameter $d_1$ of crystal grain 41 of the underlayer. Because a grain diameter at which ferromagnetic crystal grain 51 becomes superparamagnetic is smaller than 4 nm, the diameter $d_1$ preferably satisfies $4.0 \leq d_1$ [nm], more preferably $4.0 \leq d_1 \leq 12.0$ [nm]. A distance between ferromagnetic crystal grains 51 in magnetic recording layer 50, which is a width of nonmagnetic material 52, needs a certain magnitude to reduce the intergranular interaction between ferromagnetic crystal grains 51. The width $t_1$ preferably satisfies $0.5 \leq t_1$ [nm], and more preferably $0.5 \leq t_1 \leq 2.0$ [nm], to achieve a desired magnetic cluster size.

Here, "at an initial stage of growth" means at a moment when a continuous film (of underlayer 40 or magnetic recording layer 50) is formed in the initial stage of the film formation, and usually means at the moment when the film thickness reaches 1 nm. The "area of a bottom region at an initial stage of growth in a crystal grain" means an area occupied by a surface of a crystal grain (a crystal grain in underlayer 41 or ferromagnetic crystal grain 51 in magnetic recording layer 50) at the moment when the continuous film is formed in the initial stage of the film formation. The area of the bottom region of a crystal grain at the initial stage of growth can be determined by observation with a transmission electron microscope (TEM). Specifically, a planar TEM image of a 0.3×0.3 µm region at the moment of a film thickness of 1 nm is obtained, and 200 to 300 crystal grains are randomly sampled from the image. Averaging the areas of the crystal grains, the area of the bottom region of a crystal grain at the initial stage of growth is determined. Similarly, the "grain diameter $d_2$ of a crystal grain at an initial stage of growth" means an average diameter of randomly sampled 200 to 300 crystal grains. When a crystal grain has a shape different from a circular shape, a diameter of a circle having the same area as the crystal grain is defined as a grain diameter of the crystal grain. The "width $t_2$ of a grain boundary at an initial stage of growth" is defined as follows. A planar TEM image of a 0.2×0.2 µm region at the moment of a film thickness of 1 nm is obtained, and the grain boundary is traced using an image analysis apparatus to obtain a width of grain boundary t by the formula t=[(area of the grain boundary region/number of measured crystal grains)/(average peripheral length of a crystal grain)]×2.

The "top region" and "surface region" mean a surface side region of underlayer 40 or magnetic recording layer 50 remote from nonmagnetic substrate 10. The "area of a top region" is determined from a planar TEM image of a section at a position within 1 nm from the interface towards the nonmagnetic substrate. The area is calculated similarly to the area of a bottom region "at an initial stage of growth". A grain diameter $d_1$ of a crystal grain and a width $t_1$ of a grain boundary are determined in the same way as $d_2$ and $t_2$, respectively in the initial stage of growth.

A surface of crystal grain 41 in underlayer 40, which is an interface with the magnetic recording layer, is preferably flat without a curvature. "The surface of crystal grain 41 of underlayer 40 is flat" means that the maximum value of a dent or a protrusion in the surface of the crystal grain is at most 5% of the grain diameter in a side view of the crystal grain seen from a direction perpendicular to the film thickness. Specifically, a sectional profile is obtained from a cross-sectional TEM image corresponding to a linear distance of 3.0 µm on the surface shape of underlayer 40, and the maximum value of a dent or a protrusion with respect to a base line in the profile is calculated. If the calculated maximum value of the sample is not more than 5% of the grain diameter $d_1$ obtained by the above-described method, the surface of crystal grain 41 of underlayer 40 is regarded as flat.

Figure 2:
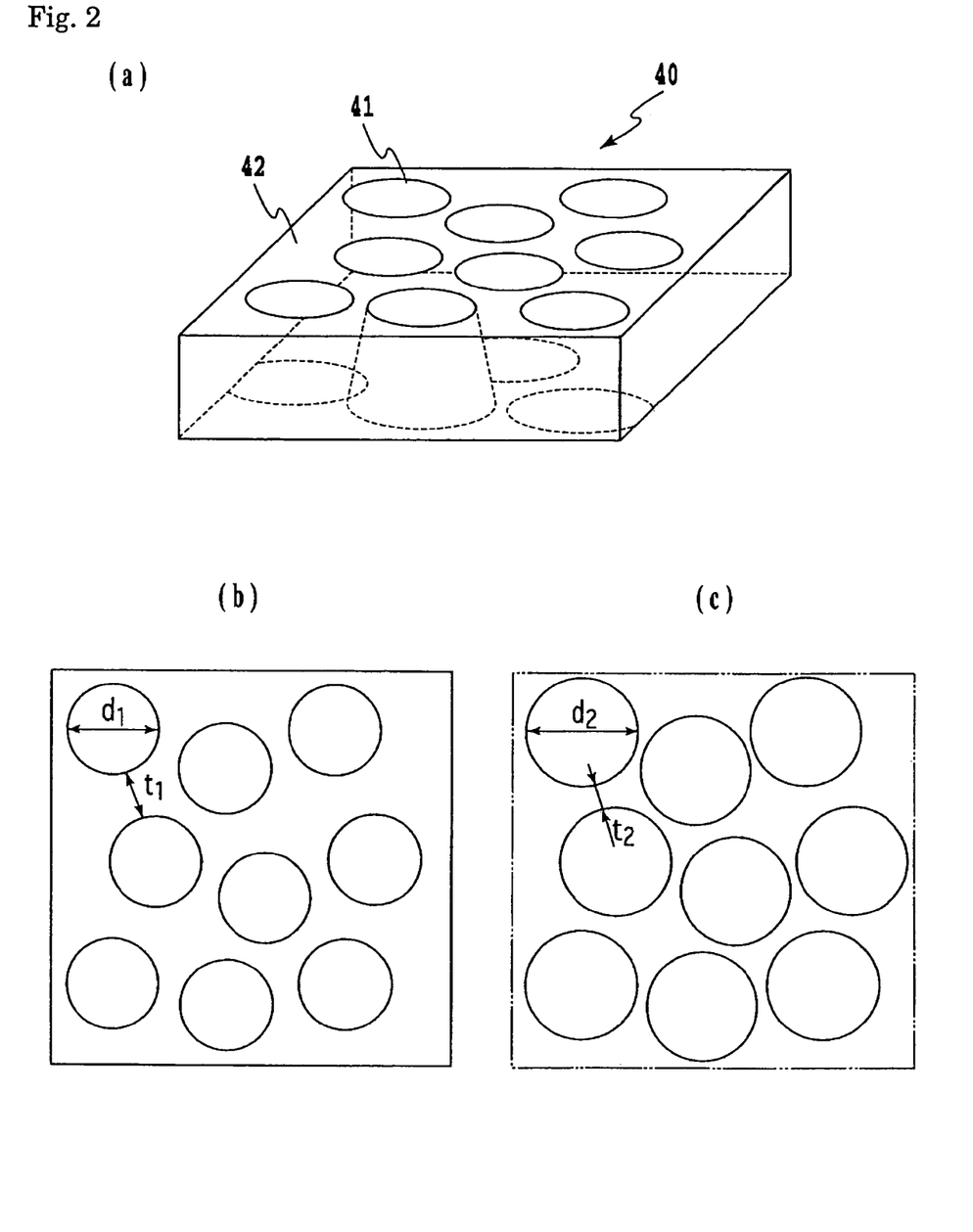
FIG. 2 shows schematically a structure of an underlayer 40 according to the invention, in which (a) is a perspective view, (b) is a plan view of the surface, and (c) is a plan view of the bottom.

FIG. 2 shows schematic drawings illustrating appropriately a structure of an underlayer according to the invention. In FIG. 2, (a) is a perspective view, (b) is a plan view of the surface (the interface with the magnetic recording layer 50), and (c) is a plan view of the bottom plane. FIG. 2 shows an example in which the shape of crystal grain 41 is roughly that of a truncated cone. The grain diameter continuously decreases from the initial region of the underlayer towards a surface region, while at the same time, the width of the grain boundary continuously increases. Because in such a shape, ratio of crystalline portion to amorphous portion is high in the region of initial stage of growth, the better crystallinity as whole layer is obtained in comparison with case of simple column structure. Even a thin underlayer 40 can attain enough crystallinity. Therefore, an effect is provided to obtain a thin film of underlayer. Because of the flat surface of crystal grains in the underlayer, the dispersion of orientations of ferromagnetic crystal grains in the magnetic recording layer is decreased, which in turn, provides an effect to reduce the dispersion of directions of the perpendicular magnetic anisotropy. Therefore, the effects are provided to stabilize the recorded information against heat and to enhance the SNR. A truncated pyramid shape is also possible as well as this example.

A material for forming crystal grains 41 of underlayer 40 can be selected from the elements including Ru, Rh, Os, Ir, and Pt. An alloy in combination of these elements, such as RuRh, RuOs, RuIr, or RuPt can also be favorably used. In addition, a material also favorably used is a substance that contains at least 50%, preferably at least 80%, of one of the above-mentioned elements as a principal component and an additive selected from Al, Si, Cr, Zr, Y, Mg, Ti, Ta, B, and Nb. Amorphous grain boundary 42 can contain oxygen or nitrogen in addition to the material described above.

Underlayer 40 is generally formed by a sputtering method (including parallel plates, magnetron, ECR, helicon wave). Crystal grains 41 having a shape holding the condition (an area of a bottom region at an initial stage of growth)>(an area of a top region) can be formed by continuously varying the deposition rate, more specifically, by continuously decreasing the deposition rate. The continuous variation of deposition rate can be carried out by controlling the input power in the sputtering process, the gas pressure within the device in the deposition process, or the periods of ON/OFF pulses in the case of pulse discharge. Preferably, the input power in the sputtering process is continuously decreased to form the desired shape of crystal grains 41.

Alternatively, oxygen or nitrogen is contained in the sputtering gas and the concentration thereof is continuously varied in the deposition process to form crystal grains having a shape holding the condition (an area of a bottom region at an initial stage of growth)>(an area of a top region). In this case, continuously increasing the concentration of the oxygen or nitrogen, the reaction product of the material of the crystal grains and the oxygen or nitrogen segregates to form amorphous grain boundary 42, and a desired shape of the crystal grain can be obtained. In this method, an additive selected from Al, Si, Cr, Zr, Y, Mg, Ti, Ta, B, and Nb, which exhibit high reactivity with the oxygen or nitrogen, can be contained in a sputtering target including at least 50 at % of an element or elements selected from Ru, Rh, Os, Ir, and Pt. The oxide or nitride segregates as a grain boundary component.

Advantageously, bias voltage to the substrate is applied and the bias voltage is varied in the deposition process of underlayer 40 to form the crystal grains having a shape holding the condition (an area of a bottom region at an initial stage of growth)>(an area of a top region). Preferably, the bias voltage is continuously increased to form the desired shape of crystal grains 41.

Magnetic recording layer 50 has a columnar structure composed of ferromagnetic crystal grains 51 and nonmagnetic material 52 surrounding the ferromagnetic crystal grains. A material of ferromagnetic crystal grains 51 is preferably composed of a principal component of Co, Fe, Ni, or the like and an additive of Pt, Cr, B, or the like, though not limited to the materials. Preferable materials include CoPt, CoPtCr, CoPtNi, FePt, CoPtB, and CoPtCrB. Preferable materials of the nonmagnetic material 52 include: nonmagnetic metals of Cr, B, and Ta; oxides of $SiO_2$, $Al_2O_3$, and $Cr_2O_3$; and nitrides of SiN, TiN, and BN, though not limited to these materials. The ratio between ferromagnetic crystal grains 51 and nonmagnetic material 52, though not specifically limited, is preferably determined considering the proportional areas of crystal grains 41 and amorphous grain boundary 42 in the underlayer. Usually, the molar proportion of the nonmagnetic grain boundary component is preferably in the range of 2 to 15%, more preferably in the range of 4 to 12%.

Magnetic recording layer 50 is formed by a sputtering method (including parallel plates, magnetron, ECR, and helicon wave) using a target of a mixture of a material for forming ferromagnetic crystal grains 51 and a material for forming nonmagnetic material 52. Ferromagnetic crystal grain 51 is formed on crystal grain 41 in the underlayer, and nonmagnetic material 52 is formed on amorphous grain boundary 42 in the underlayer. By the effects of crystal grains 41 and amorphous grain boundary 42 in underlayer 40, ferromagnetic crystal grains 51 in magnetic recording layer 50 are appropriately physically isolated each other from the initial stage of growth, and thereby appropriately magnetically isolated, too, which means attainment of a small cluster size.

Figure 3:
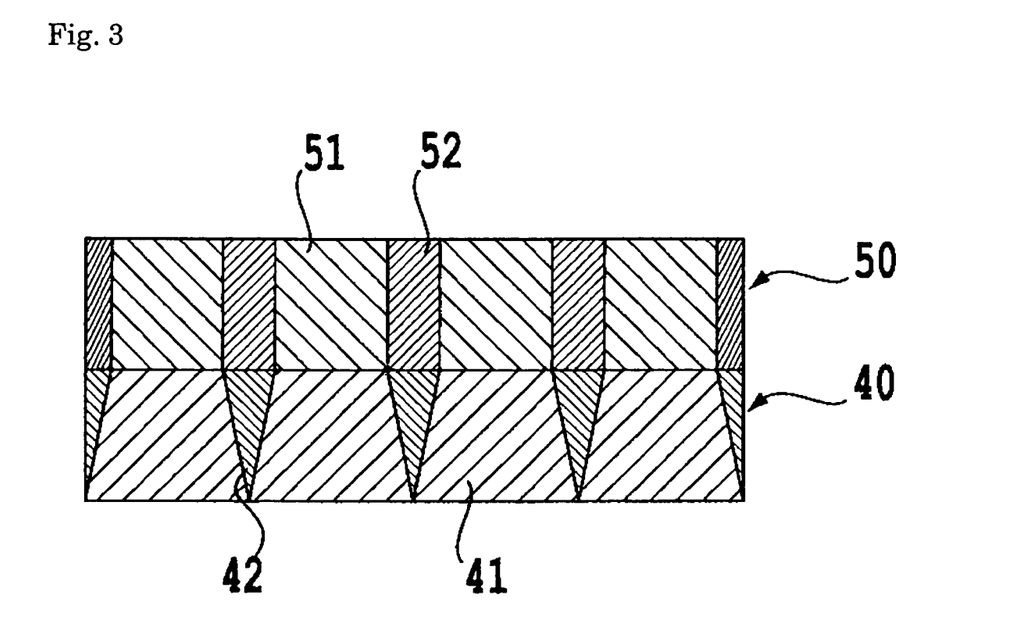
FIG. 3 is a schematic sectional view showing structures of an underlayer 40 and a magnetic recording layer 50 according to the invention.

FIG. 3 is a schematic sectional view illustrating the correlation of between the structure of underlayer 40 and the structure of magnetic recording layer 50 according to the invention. FIG. 3 is a sectional view of an example comprising crystal grains 41 in underlayer 40 having roughly a truncated cone shape, as in FIG. 2. Magnetic recording layer 50 has a columnar structure in which the ferromagnetic crystal grains are surrounded by the nonmagnetic material, the structure reflecting the grain diameter of the crystal grains and the width of the amorphous grain boundary of underlayer 40. The columnar structure can be a column with a polygonal cross-section, as well as a cylindrical shape.

Protective layer 60 can be a conventionally employed protective film for example substantially composed of carbon. Protective layer 60 can be formed by a sputtering method (including parallel plates, magnetron, ECR, helicon wave etc.) or CVD method.

Lubricant layer 70 can also be composed of a conventionally used material for example, a liquid lubricant of perfluoropolyether. Lubricant layer 70 can be formed by a common method such as dip coating, spin coating, or spray coating. The conditions of a thickness of protective layer 60 and a thickness of lubricant layer 70 can be the same as the conditions employed in common magnetic recording media.

A magnetic recording device can be constructed using a perpendicular magnetic recording medium described above. A magnetic recording device according to the invention comprises at least a perpendicular magnetic recording medium for recording information and a magnetic head for reading and writing information. A magnetic head for writing information and a magnetic head for reading information can be individually provided. A magnetic recording device of the invention preferably further comprises a means for moving the magnetic recording medium in reference to the magnetic head, a means for positioning the magnetic head, and/or a means for communicating and/or transforming information with external devices. The means for moving the perpendicular magnetic recording medium relative to the magnetic head can be either a means for linearly moving the perpendicular magnetic recording medium or a means for rotating the perpendicular magnetic recording medium. The means for positioning the magnetic head moves the magnetic head to a position of reading or writing information and fixes the magnetic head at that position using a common element such as a stepping motor. The means for communicating and transforming information selects a device to communicate information, sends and receives information using an appropriate protocol, and as required, compresses or expands information.

The following describes some specific examples of embodiment of a method of manufacturing a perpendicular magnetic recording medium according to the invention. The examples, however, are merely representative examples to appropriately illustrate a method of manufacturing a perpendicular magnetic recording medium of the invention, and the invention shall not be limited to the examples.

EXAMPLE 1

In this example, a double layer perpendicular medium having a structure as shown in FIG. 1 was manufactured. Nonmagnetic substrate 10 was a chemically strengthened glass substrate having a smooth surface (for example, N-5 glass substrate manufactured by HOYA Corporation). After cleaning, the substrate was introduced into a DC magnetron sputtering apparatus, and soft magnetic backing layer 20 of amorphous CoZrNb having a thickness of 150 nm was formed using a target of $Co_{91}Zr_5Nb_4$ in an argon atmosphere at 5 mTorr (0.67 Pa). Then, seed layer 30 of soft magnetic NiFeSi having a thickness of 10 nm was formed using a target of $Ni_{84}Fe_{13}Si_3$ in an argon atmosphere at 30 mTorr (4.0 Pa).

Figure 4:
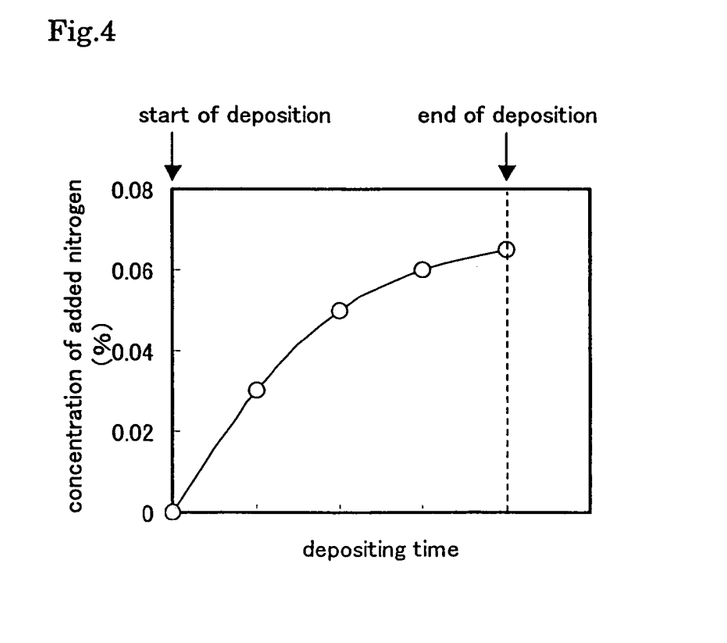
FIG. 4 is a graph showing the change with time of the concentration of nitrogen added in the underlayer formation process in Example 1 according to the invention.

Next, underlayer 40 of RuSi having a thickness of 10 nm was deposited using a target of $Ru_{95}Si_5$ under a pressure of 30 mTorr (4.0 Pa). An atmosphere in the DC magnetron sputtering apparatus was wholly argon gas at the start of the deposition. After start of the deposition, the addition of nitrogen gas to the argon gas began, maintaining the pressure within the apparatus. The concentration (vol %) of the additive gas was varied as shown in FIG. 4. The input power in the sputtering process was fixed at 600 W throughout the deposition step.

After that, magnetic recording layer 50 of CoPtCr—$SiO_2$ having a thickness of 13 nm was deposited using a target of 93 mol % ($Co_{74}Pt_{14}Cr_{12}$: average chemical formula weight 77.16 was taken as one mol)—7 mol % ($SiO_2$) in an argon gas atmosphere at 30 mTorr (4.0 Pa). Finally, protective layer 60 of carbon having a thickness of 4 nm was deposited using a carbon target. Then, the lamination having the above-described layers on the substrate was taken out from the DC magnetron sputtering apparatus. Substrate heating was not conducted in every deposition step. Finally, liquid lubricant layer 70 of perfluoropolyether having a thickness of 2 nm was formed by a dipping method, thus, a double layer perpendicular medium was obtained.

EXAMPLE 2

Figure 5:
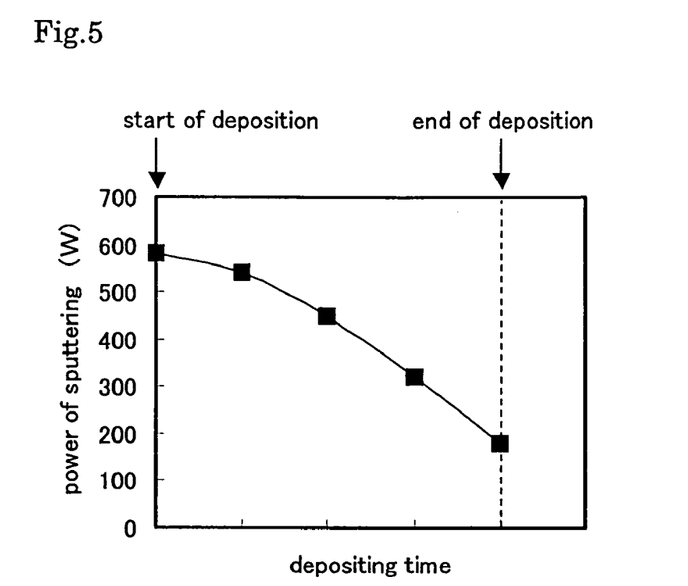
FIG. 5 is a graph showing the change with time of the sputtering power in the underlayer formation process in Example 2 according to the invention.

A double layer perpendicular medium was obtained in the same manner as in Example 1 except that underlayer 40 was formed in the following way. Underlayer 40 of RuSi 10 nm thick was deposited using a target of $Ru_{95}Si_5$ in an argon atmosphere at 30 mTorr (4.0 Pa). After the start of deposition, the input power in the sputtering process was varied as shown in FIG. 5. The atmospheric gas in the apparatus was wholly argon gas throughout the deposition step.

EXAMPLE 3

Figure 6:
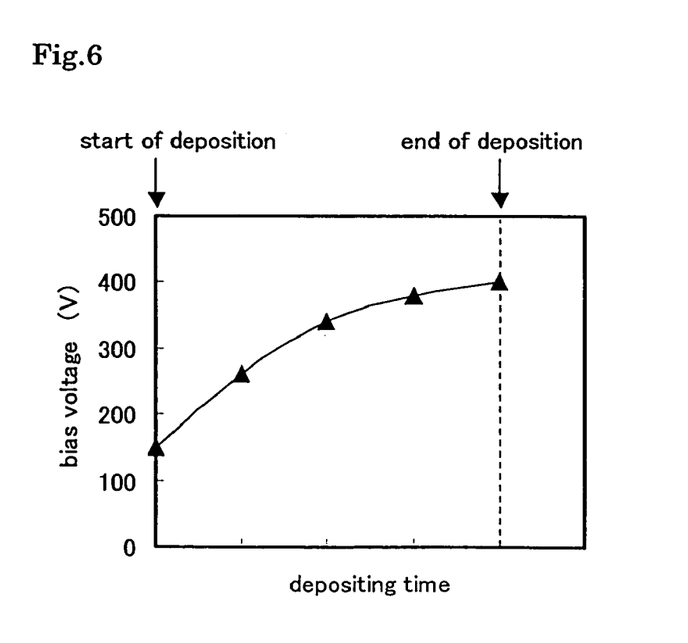
FIG. 6 is a graph showing the change with time of the applied bias voltage in the underlayer formation process in Example 3 according to the invention.

A double layer perpendicular medium was obtained in the same manner as in Example 1 except that underlayer 40 was formed in the following way. Underlayer 40 of RuSi 10 nm thick was deposited using a target of $Ru_{95}Si_5$ in an argon atmosphere at 30 mTorr (4.0 Pa). After the start of deposition, the applied voltage to the substrate was varied as shown in FIG. 6. The atmospheric gas in the apparatus was wholly argon gas throughout the deposition step.

Comparative Example

A double layer perpendicular medium was obtained in the same manner as in Example 1 except that underlayer 40 was formed without the addition of nitrogen gas to argon gas.

First, evaluation results on the fine structure of the magnetic recording medium of the examples are described. Planar observation and sectional observation were conducted by a TEM on the double layer perpendicular media of Examples 1 to 3 and Comparative Example.

Sectional Structure of the Underlayer and the Magnetic Recording Layer

The sectional observation on the double layer perpendicular medium obtained in Example 1 showed that from the initial stage of growth of underlayer 40 of RuSi, the width of amorphous grain boundary 42 gradually increased and the grain diameter of crystal grain 41 gradually decreased. Since the cross-sectional shape of crystal grain 41 was shown circular by the planar observation described later, the shape of the crystal grain was roughly a truncated cone. It was confirmed that ferromagnetic crystal grain 51 grew in a columnar shape surrounded by nonmagnetic material 52 in magnetic recording layer 50 of CoPtCr—SiO$_2$, maintaining the grain diameter of crystal grain 41 and the width of amorphous grain boundary 42 of underlayer 40 of RuSi. It was also confirmed that the interface between underlayer 40 and magnetic recording layer 50 was flat and that magnetic recording layer 50 grew epitaxially. The structure of the double layer perpendicular medium of Examples 2 and 3 were confirmed to be similar to the structure in Example 1.

In underlayer 40 of the double layer perpendicular medium of the Comparative Example, on the contrary, the width of the grain boundary did not change in the process of increasing the film thickness. The width of grain boundary was narrow and a clear isolation structure was not observed. As a result, in the magnetic recording layer of CoPtCr—SiO$_2$ deposited on the underlayer, isolation between ferromagnetic crystal grain 51 and nonmagnetic material 52 was poor.

Grain Diameter, Width of Grain Boundary, and Dispersion of Grain Diameter in the Underlayer and in the Magnetic Recording Layer To quantitatively evaluate the structures of the underlayer and the magnetic recording layer, measurements of the planar TEM images were made on the grain diameter of crystal grain 41 and the width of amorphous grain boundary 42 in underlayer 40, and the grain diameter of ferromagnetic crystal grain 51 and the width of nonmagnetic material 52 in magnetic recording layer 50. Dispersion of the grain diameters in each layer was also calculated. The measurements and calculations were made on the four cross sections shown in FIG. 7 (initial region of the underlayer: section A, top region of the underlayer: section B, initial region of the magnetic recording layer: section C, and top region of the magnetic recording layer: section D). The section A is at 1 nm in thickness direction from the interface between seed layer 30 and underlayer 40, and the section B is at 9 nm in thickness direction from this interface. The section C is at 1 nm in thickness direction from the interface between underlayer 40 and magnetic recording layer 50, and the section D is at 12 nm in thickness direction from this interface.

Figure 7:
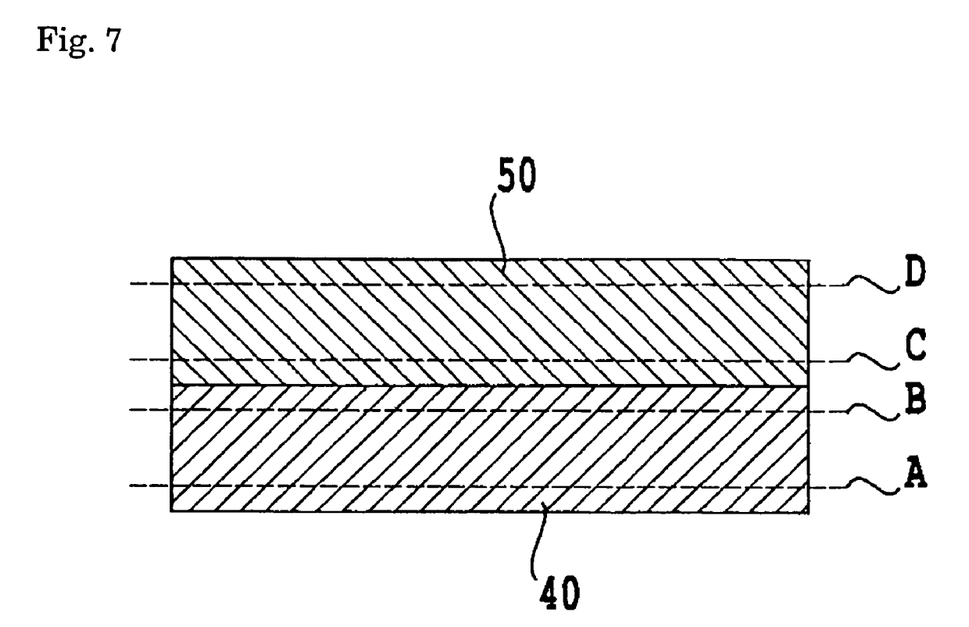
FIG. 7 is a sectional view indicating the observed surfaces in the planar TEM observations in examples according to the invention and a comparative example.

Table 1 summarizes average grain diameter d, width of grain boundary t, and coefficient of variation of grain diameter σ/d (where σ is standard deviation of grain diameter distribution). Looking at the data of section A and section B, in Examples 1 to 3, the grain diameter is smaller at section B than at section A, which supports the result of the cross sectional observation. In the Comparative Example, in contrast to the results of Examples 1 to 3, the grain diameter is a little larger and the width of grain boundary is a little narrower at section B than at section A. Regarding the data at section B, d is smaller, t is larger, and σ/d is smaller in Examples 1 to 3 than in Comparative Example. These observation results demonstrated that crystal grains 41 in underlayer 40 have been controlled in roughly a truncated cone shape by continuously varying (increasing) the concentration of added nitrogen in the deposition process of the underlayer, by continuously varying (decreasing) the input power in the sputtering process, or by continuously varying (increasing) the applied voltage to substrate in the sputtering process.

Comparing the section B at the top region of underlayer 40 and the section C at the initial stage of deposition of the magnetic recording layer 50, the d, t, and σ/d at section C are approximately equal to respective values at section B in every sample of Examples 1 to 3, and Comparative Example. This fact certifies that the initial stage of the magnetic recording layer reflects the structure on the underlayer surface.

Next, looking at the data of section C and section D, in Examples 1 to 3, the d, t, and σ/d at section D are approximately equal to respective values at section C, which supports the results of cross sectional observation that magnetic recording layer 50 grows in a columnar shape. In Comparative Example, the d is larger and the t is smaller at section D than at section C. The width of amorphous grain boundary 42 on the surface of underlayer 40 and the width of nonmagnetic material 52 at the initial stage of deposition of magnetic recording layer 50 that reflects the width of grain boundary in the underlayer, are so narrow that joining of neighboring ferromagnetic crystal grains occurs in the course of growth of magnetic recording layer 50, swelling the grain diameter of the ferromagnetic crystal grains.

As described above, it has been demonstrated that the physical isolation between ferromagnetic crystal grains 51 is enhanced, and the grain diameter and the dispersion of grain diameter are reduced in magnetic recording layer 50 by employing underlayer 40 according to the invention.

TABLE 1

Average grain diameter, average width of grain boundary, and dispersion of grain diameter at various sections

| | section | average grain diameter d [nm] | average width of grain boundary t [nm] | dispersion of grain diameter σ/d |
|---|---|---|---|---|
| Example 1 | A | 7.4 | 0.6 | 0.221 |
| | B | 6.7 | 1.2 | 0.208 |
| | C | 6.8 | 1.2 | 0.214 |
| | D | 6.7 | 1.2 | 0.201 |
| Example 2 | A | 7.3 | 0.6 | 0.224 |
| | B | 6.9 | 1.0 | 0.215 |
| | C | 6.9 | 1.0 | 0.218 |
| | D | 7.0 | 1.0 | 0.211 |
| Example 3 | A | 7.1 | 0.6 | 0.214 |
| | B | 6.7 | 1.2 | 0.201 |
| | C | 6.7 | 1.2 | 0.198 |
| | D | 6.7 | 1.2 | 0.196 |
| Comp Ex | A | 7.3 | 0.6 | 0.224 |
| | B | 7.6 | 0.4 | 0.267 |
| | C | 7.8 | 0.4 | 0.278 |
| | D | 9.1 | 0.3 | 0.326 |

Evaluation of Practical Performance

Effects of the structure of magnetic recording layer 50 as described above on the magnetic cluster size and the practical electromagnetic conversion characteristics were studied. The medium surface was observed by a magnetic force microscope (MFM) after AC demagnetization. From the obtained image, a cross sectional area of a magnetic cluster was obtained assuming the magnetic cluster is a cylinder, the diameter of which was defined as a magnetic cluster size. Evaluation of electromagnetic conversion characteristic was conducted with a spinning stand tester equipped with a single pole/GMR head, to obtain SNR. Decay rate of output signal was obtained by measuring the change in 10,000 sec of output signals written at a linear recording density of 100 kFCI using the same magnetic head and spinning stand tester as in the evaluation of electromagnetic conversion characteristic.

Table 2 shows the magnetic cluster size and SNR measured on the double layer perpendicular media of Examples 1 to 3, and the Comparative Example. The SNR shown is an example measured at a linear recording density of 600 kFCl. Comparative merits in the SNR have been confirmed not to alter depending the recording density.

In the double layer perpendicular media of Examples 1 to 3 as compared with the Comparative Example, the magnetic cluster size is remarkably smaller, less than half, and the SNR is larger by more than 6 dB. This result shows that in the double layer perpendicular media of Examples 1 to 3, the magnetic interaction between ferromagnetic crystal grains 51 in magnetic recording layer 50 decreased owing to the effect of underlayer 40, thereby decreasing the magnetic cluster size and reducing noises to improve the SNR. Decay of signals is nearly zero in every double layer perpendicular medium of Examples 1 to 3, and the Comparative Example, indicating satisfactory resistance to thermal fluctuation. The reason for good resistance to thermal fluctuation despite the relatively small magnetic cluster size in the double layer perpendicular medium of Examples 1 to 3 is because the crystal magnetic anisotropy is sufficiently large in magnetic recording layer 50 in which the epitaxial growth has been confirmed by the cross sectional observation with a TEM as described previously.

TABLE 2

Magnetic cluster size and SNR in double layer perpendicular media

|  | magnetic cluster size [nm] | SNR [dB] |
|---|---|---|
| Example 1 | 18.7 | 19.4 |
| Example 2 | 22.2 | 18.5 |
| Example 3 | 16.8 | 20.0 |
| Comp Ex | 50.8 | 12.1 |

Though underlayer 40 was composed of RuSi in the above Examples, an underlayer composed of a material containing at least one substance selected from Ru, Rh, Os, Ir, and Pt can provide the same effects. Though the additive gas was nitrogen, oxygen can provide the same effects. Though the variation of deposition speed was controlled by the input power, the same effects can be obtained by varying the gas pressure in the deposition process or by varying the ON/OFF period of pulse discharge. Though magnetic recording layer 50 was composed of CoPtCr—SiO$_2$, the same effects can be obtained by magnetic recording layers composed of for example, CoPt—SiO$_2$ or CoPtCrB—SiO$_2$ in which a material for ferromagnetic crystal grains 51 is replaced, or composed of CoPtCr—Cr$_2$O$_3$, CoPtCr—SiN, or the like in which a material for the portion of nonmagnetic material 52 is replaced. Further, seed layer 30 and soft magnetic baking layer 20 can also be modified.

Thus, a perpendicular recording medium has been described according to the present invention. Many modifications and variations may be made to the techniques and structures described and illustrated herein without departing from the spirit and scope of the invention. Accordingly, it should be understood that the methods and devices described herein are illustrative only and are not limiting upon the scope of the invention.

What is claimed is:

1. A perpendicular magnetic recording medium comprising a nonmagnetic substrate, and at least a non-magnetic underlayer and a magnetic recording layer sequentially laminated on the substrate, wherein the non-magnetic underlayer consists of crystal grains and an amorphous grain boundary, and the crystal grain has a shape in which an area of a bottom region at an initial stage of growth is greater than an area of a top region, and wherein the amorphous grain boundary extends along the entire height of the grain.

2. The perpendicular magnetic recording medium according to claim 1, wherein the magnetic recording layer comprises ferromagnetic crystal grains and a nonmagnetic material surrounding the ferromagnetic crystal grains, each ferromagnetic crystal grain having a grain diameter substantially equal to a grain diameter at the top region of the crystal grains in the non-magnetic underlayer, and width of the non-magnetic material being substantially equal to a width at the top region of the amorphous grain boundary in the non-magnetic underlayer.

3. The perpendicular magnetic recording medium according to claim 1, wherein $d_1$ is at least 4.0 nm and $t_1$ is at least 0.5 nm, and $d_2 > d_1$ and $t_2 < t_1$, where $d_1$ and $t_1$ are a grain diameter at the top region of the crystal grain and a width at the top region of the amorphous grain boundary in the non-magnetic underlayer, respectively, and $d_2$ and $t_2$ are a grain diameter at the initial stage of growth of the crystal grain and a width at the initial stage of growth of the amorphous grain boundary in the non-magnetic underlayer, respectively.

4. The perpendicular magnetic recording medium according to claim 1, wherein a surface of the crystal grain in the non-magnetic underlayer is flat at an interface between the non-magnetic underlayer and the magnetic recording layer.

5. The perpendicular magnetic recording medium according to claim 1, additionally comprising a seed layer beneath the non-magnetic underlayer.

6. The perpendicular magnetic recording medium according to claim 1, wherein the crystal grains in the non-magnetic underlayer have a shape of a truncated cone or a truncated pyramid.

7. The perpendicular magnetic recording medium according to claim 1, wherein the crystal grains in the non-magnetic underlayer contain at least 50 at % of Ru, Rh, Os, Ir or Pt.

8. The perpendicular magnetic recording medium according to claim 1, wherein the amorphous grain boundary contains oxygen or nitrogen.

9. A method of manufacturing a perpendicular magnetic recording medium including at least a non-magnetic underlayer and a magnetic recoding layer sequentially laminated on a nonmagnetic substrate, the method comprising:

forming on a nonmagnetic substrate a non-magnetic underlayer that consists of (i) crystal grains having a shape in which an area of a bottom region at an initial stage of growth is greater than an area of a top region, and (ii) an amorphous grain boundary, by continuously varying deposition rate; and forming the magnetic recording layer on the non-magnetic underlayer, and wherein the amorphous grain boundary extends along the entire height of the grain.

10. A method of manufacturing a perpendicular magnetic recording medium including at least a non-magnetic underlayer and a magnetic recoding layer sequentially laminated on a nonmagnetic substrate, the method comprising:

forming on a nonmagnetic substrate a non-magnetic underlayer that consists of (i) crystal grains having a shape in which an area of a bottom region at an initial stage of growth is greater than an area of a top region, and (ii) an amorphous grain boundary, by adding oxygen or nitrogen to an atmosphere in a deposition process and continuously varying a concentration of the oxygen or nitrogen; and forming a magnetic recording layer on the non-magnetic underlayer, and wherein the amorphous grain boundary extends along the entire height of the grain.

11. A method of manufacturing a perpendicular magnetic recording medium including at least a non-magnetic underlayer and a magnetic recoding layer sequentially laminated on a nonmagnetic substrate, the method comprising:

forming on a non-magnetic substrate a non-magnetic underlayer that consists of (i) crystal grains having a shape in which an area of a bottom region at an initial stage of growth) is greater than an area of a top region, and (ii) an amorphous grain boundary, by applying bias voltage to the substrate and varying the bias voltage; and forming a magnetic recording layer on the non-magnetic underlayer, and wherein the amorphous grain boundary extends along the entire height of the grain.

12. A magnetic recording device comprising at least a perpendicular magnetic recording medium defined by any one of claims 1 through 8 and a magnetic head.

* * * * *